(12) United States Patent
Matozaki et al.

(10) Patent No.: US 9,844,850 B2
(45) Date of Patent: Dec. 19, 2017

(54) MACHINE TOOL

(71) Applicant: MURATA MACHINERY, LTD., Kyoto-shi, Kyoto (JP)

(72) Inventors: Toshihiko Matozaki, Inuyama (JP); Norio Kaku, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 235 days.

(21) Appl. No.: 14/872,379

(22) Filed: Oct. 1, 2015

(65) Prior Publication Data
US 2016/0107240 A1 Apr. 21, 2016

(30) Foreign Application Priority Data

Oct. 20, 2014 (JP) ................ 2014-213528

(51) Int. Cl.
*B23B 13/04* (2006.01)
*B23B 13/12* (2006.01)
(Continued)

(52) U.S. Cl.
CPC ........ *B23Q 39/027* (2013.01); *B23Q 7/048* (2013.01); *B23B 13/04* (2013.01); *B23B 13/123* (2013.01);
(Continued)

(58) Field of Classification Search
CPC ........ B23Q 7/048; B23Q 7/045; B23Q 7/041; B23Q 2707/003; B23Q 2707/04;
(Continued)

(56) References Cited

U.S. PATENT DOCUMENTS 4,949,444 A * 8/1990 Kojima .............. B23B 3/06 29/27 R
5,020,402 A * 6/1991 Link ............... B23Q 7/04 82/124

(Continued)

FOREIGN PATENT DOCUMENTS

DE 3418893 A1 * 11/1984 ........... B23Q 7/045
DE 3530982 A1 * 3/1987 ........... B23Q 7/045
(Continued)

*Primary Examiner* — Daniel Howell
*Assistant Examiner* — Ryan Rufo
(74) *Attorney, Agent, or Firm* — Keating & Bennett, LLP

(57) ABSTRACT

A machine tool capable of reducing the time required to transfer a workpiece includes a spindle chuck provided to a spindle that rotates about an axis, and capable of holding a workpiece to be worked on, a temporary placement chuck capable of holding a workpiece, a tool post driver to move the temporary placement chuck relatively to a facing position in which the spindle-side workpiece holder and the workpiece holder for temporary placement are able to transfer or receive a workpiece to or from each other, and to a separated position in which the spindle-side workpiece holder and the workpiece holder for temporary placement are able to transfer or receive a workpiece individually, and a loader including a spindle-corresponding workpiece holder and a temporary placement-corresponding workpiece holder disposed to face the spindle chuck and the temporary placement chuck in the separated position, respectively.

5 Claims, 8 Drawing Sheets

(51) Int. Cl.
*B23Q 7/04* (2006.01)
*B23Q 39/02* (2006.01)
*B23B 29/26* (2006.01)
*B23Q 1/01* (2006.01)
*B23Q 11/10* (2006.01)
*B23Q 39/00* (2006.01)

(52) U.S. Cl.
CPC ............ *B23B 13/128* (2013.01); *B23B 29/26* (2013.01); *B23Q 1/015* (2013.01); *B23Q 7/041* (2013.01); *B23Q 11/10* (2013.01); *B23Q 2039/008* (2013.01); *B23Q 2707/003* (2013.01)

(58) Field of Classification Search
CPC ..... B23B 13/04; B23B 13/123; B23B 13/128; B23B 29/26; Y10T 82/2514; Y10T 82/2543; Y10T 82/2524
See application file for complete search history.

(56) References Cited

U.S. PATENT DOCUMENTS

| | | | |
|---|---|---|---|
| 5,243,534 A * | 9/1993 | Takahashi Yoshikatsu | G05B 19/182 700/169 |
| 5,309,368 A * | 5/1994 | Chern | B23Q 3/1576 483/14 |
| 5,513,560 A * | 5/1996 | Downing | B23Q 7/048 100/161 |
| 7,717,019 B2 | 5/2010 | Ito | |
| 2002/0134207 A1* | 9/2002 | Miyano | B23Q 1/015 82/1.11 |
| 2006/0218764 A1* | 10/2006 | Hashimoto | B23Q 39/028 29/27 C |
| 2007/0084319 A1* | 4/2007 | Ueda | B23B 3/167 82/129 |
| 2009/0198367 A1* | 8/2009 | Matsumoto | B23Q 39/04 700/112 |
| 2010/0282037 A1* | 11/2010 | Fujimoto | B23B 3/30 82/121 |

FOREIGN PATENT DOCUMENTS

| | | | | |
|---|---|---|---|---|
| DE | 102007051904 B3 * | 2/2009 | ............ | B23Q 7/045 |
| JP | 2010-099747 A | 5/2010 | | |
| JP | 2012-130979 A | 7/2012 | | |
| WO | WO 2004/065061 A1 * | 8/2004 | ............ | B23Q 7/048 |
| WO | WO 2009/060579 A1 * | 5/2009 | ............ | B23Q 7/045 |

* cited by examiner

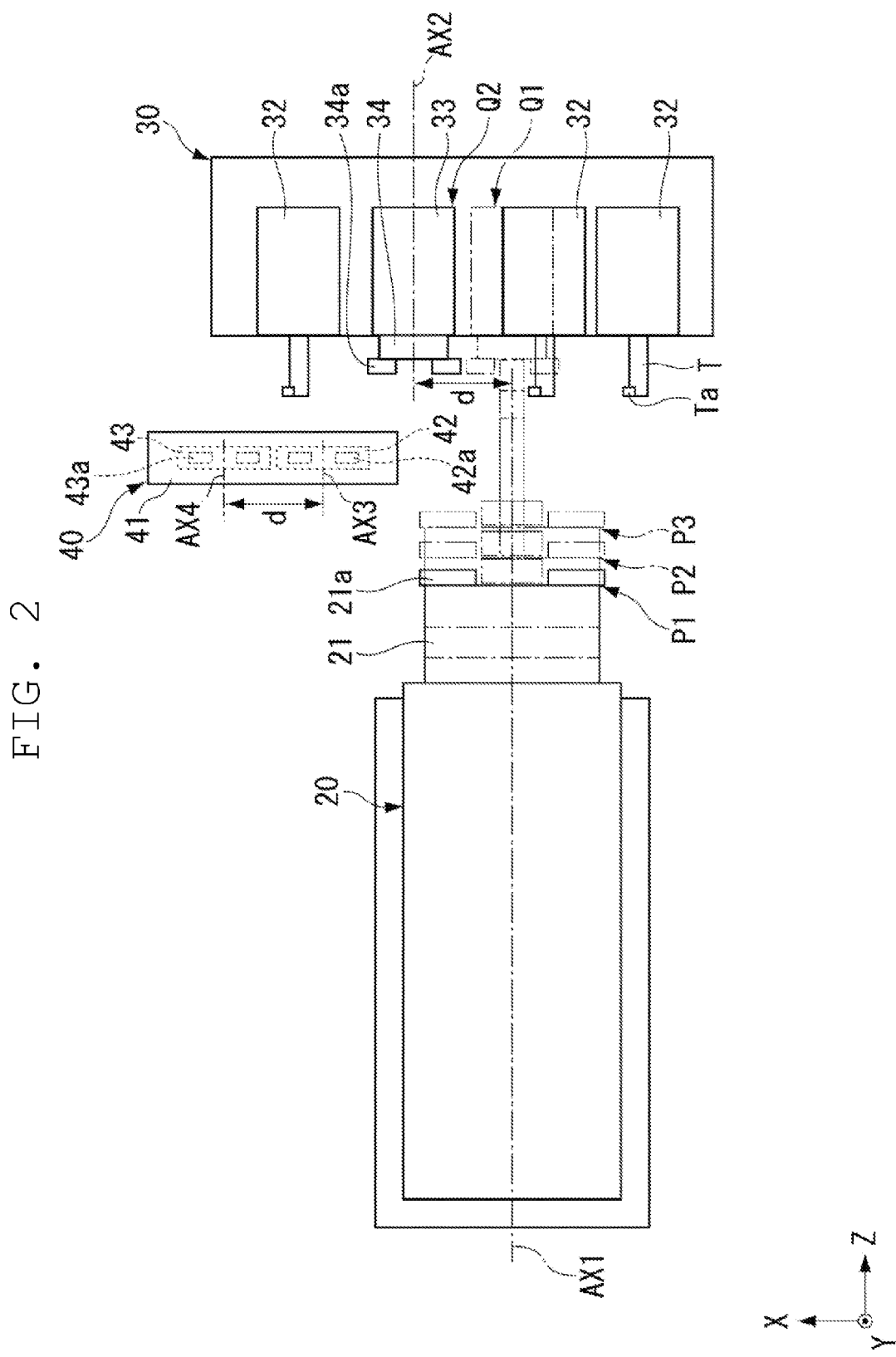

MACHINE TOOL

BACKGROUND OF THE INVENTION

1. Field of the Invention

The present invention relates to machine tools.

2. Description of the Related Art

A lathe, a machine tool, includes a spindle adapted to hold and rotate a workpiece, and a tool post adapted to hold a cutting tool to cut the workpiece, and performs cutting work, while moving the workpiece and the cutting tool relatively. As such a lathe, for example, one having a loader that transfers or receives a workpiece to or from a spindle, and transports the workpiece between the spindle and a predetermined position (for example, see JP 2012-130979 A), and one that transfers or receives a workpiece to or from a spindle, using a workpiece relay device provided on a tool post (for example, see JP 2010-99747 A) are known. On the lathe described in JP 2010-99747 A, a workpiece is transferred to or received from the workpiece relay device by an operator's manual operation.

The lathe described in JP 2010-99747 A, on which an operator manually transfers or receives a workpiece to or from the workpiece relay device, thus poses a problem that, in addition to the troublesome work, it takes a longer time to transfer a workpiece between the spindle and a loader, resulting in a longer time required for entire machining. In particular, even when cutting work on a workpiece is reduced in time, the need for a longer time to transfer the workpiece makes greater efficiency of the entire machining impossible.

SUMMARY OF THE INVENTION

In view of the above circumstances, preferred embodiments of the present invention provide a machine tool capable of reducing the time required to transfer a workpiece.

A machine tool according to a preferred embodiment of the present invention includes a spindle-side workpiece holder provided to a spindle that rotates about an axis, and capable of holding a workpiece to be worked on, a workpiece holder for temporary placement capable of holding the workpiece, a driver that moves the spindle-side workpiece holder and the workpiece holder for temporary placement relatively to a facing position in which the spindle-side workpiece holder and the workpiece holder for temporary placement are able to transfer or receive the workpiece to or from each other, and to a separated position in which the spindle-side workpiece holder and the workpiece holder for temporary placement are able to transfer or receive the workpiece individually, and a loader including a spindle-corresponding workpiece holder and a temporary placement-corresponding workpiece holder disposed to face the spindle-side workpiece holder and the workpiece holder for temporary placement in the separated position, respectively.

The spindle-side workpiece holder and the workpiece holder for temporary placement may be moved relatively in a direction intersecting an axis of the spindle. The spindle-side workpiece holder and the workpiece holder for temporary placement may be moved relatively in a horizontal direction, and the spindle-corresponding workpiece holder and the temporary placement-corresponding workpiece holder may simultaneously transfer or receive the workpiece to or from the spindle-side workpiece holder and the workpiece holder for temporary placement, respectively. The spindle-corresponding workpiece holder and the temporary placement-corresponding workpiece holder may each include a pair of jaws capable of holding the workpiece, and the jaws may be disposed side by side in the horizontal direction. A tool post holding a cutting tool to work on the workpiece, and a tool post driver that moves the tool post with respect to the workpiece may be further included, and the workpiece holder for temporary placement may be provided on the tool post, and the tool post driver may be used as the driver. A controller configured or programmed to control the spindle-corresponding workpiece holder and the temporary placement-corresponding workpiece holder may be further included, and the controller may operate one of the spindle-corresponding workpiece holder and the temporary placement-corresponding workpiece holder to receive the workpiece, and simultaneously operate the other of the spindle-corresponding workpiece holder and the temporary placement-corresponding workpiece holder to transfer the workpiece held in advance. The controller may transport the workpiece by the loader while the workpiece is transferred between the spindle-side workpiece holder and the workpiece holder for temporary placement.

According to various preferred embodiments of the present invention, when the spindle-side workpiece holder and the workpiece holder for temporary placement are in the separated position, the spindle-corresponding workpiece holder and the temporary placement-corresponding workpiece holder are able to simultaneously transfer or receive a workpiece to or from the spindle-side workpiece holder and the workpiece holder for temporary placement, respectively. This reduces the time required to transfer a workpiece between the spindle and the loader, reducing the time required for entire machining, and thus increasing machining efficiency.

Further, the machine tool with the spindle-side workpiece holder and the workpiece holder for temporary placement that are moved relatively in a direction intersecting the axis of the spindle prevent an increase in size of the machine tool in the spindle axial direction. Furthermore, the machine tool with the spindle-side workpiece holder and the workpiece holder for temporary placement that are moved relatively in a horizontal direction, and with the spindle-corresponding workpiece holder and the temporary placement-corresponding workpiece holder that simultaneously transfer or receive a workpiece to or from the spindle-side workpiece holder and the workpiece holder for temporary placement, respectively, prevent interference during moving because the spindle-side workpiece holder and the workpiece holder for temporary placement, and the spindle-corresponding workpiece holder and the temporary placement-corresponding workpiece holder move in a direction perpendicular or substantially perpendicular to each other. Moreover, the machine tool with the spindle-corresponding workpiece holder and the temporary placement-corresponding workpiece holder each including a pair of jaws capable of holding the workpiece, the jaws disposed side by side in a horizontal direction, allows transfer of the workpiece with the spindle-corresponding workpiece holder and the temporary placement-corresponding workpiece holder disposed side by side in the horizontal direction. Further, the machine tool including a tool post holding a cutting tool to work on the workpiece, and a tool post driver that moves the tool post with respect to the workpiece, in which the workpiece holder for temporary placement is provided on the tool post, and the tool post driver is used as the driver, facilitates placement of the spindle-side workpiece holder and the workpiece holder for temporary placement in the facing position. Furthermore, the machine tool including a controller configured or programmed to control the spindle-corresponding workpiece holder and the temporary placement-corresponding workpiece holder, in which the controller operates one of the spindle-corresponding workpiece holder and the temporary placement-corresponding workpiece holder to receive the workpiece, and simultaneously operates the other of the spindle-corresponding workpiece holder and the temporary placement-corresponding workpiece holder to transfer the workpiece held in advance, allows different holders to simultaneously perform an operation of receiving a workpiece and an operation of transferring a workpiece, thus reducing the time required for transfer of a workpiece. Moreover, the machine tool with the controller that transports the workpiece by the loader while the workpiece is transferred between the spindle-side workpiece holder and the workpiece holder for temporary placement, allows transfer of a workpiece between the spindle-side workpiece holder and the workpiece holder for temporary placement and transportation of a workpiece by the loader to be performed at the same time, thus reducing non-working time of a workpiece.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a plan view showing an example of a spindle, a tool post, and a loader according to a preferred embodiment of the present invention.

DETAILED DESCRIPTION OF THE PREFERRED EMBODIMENTS

Figure 1:
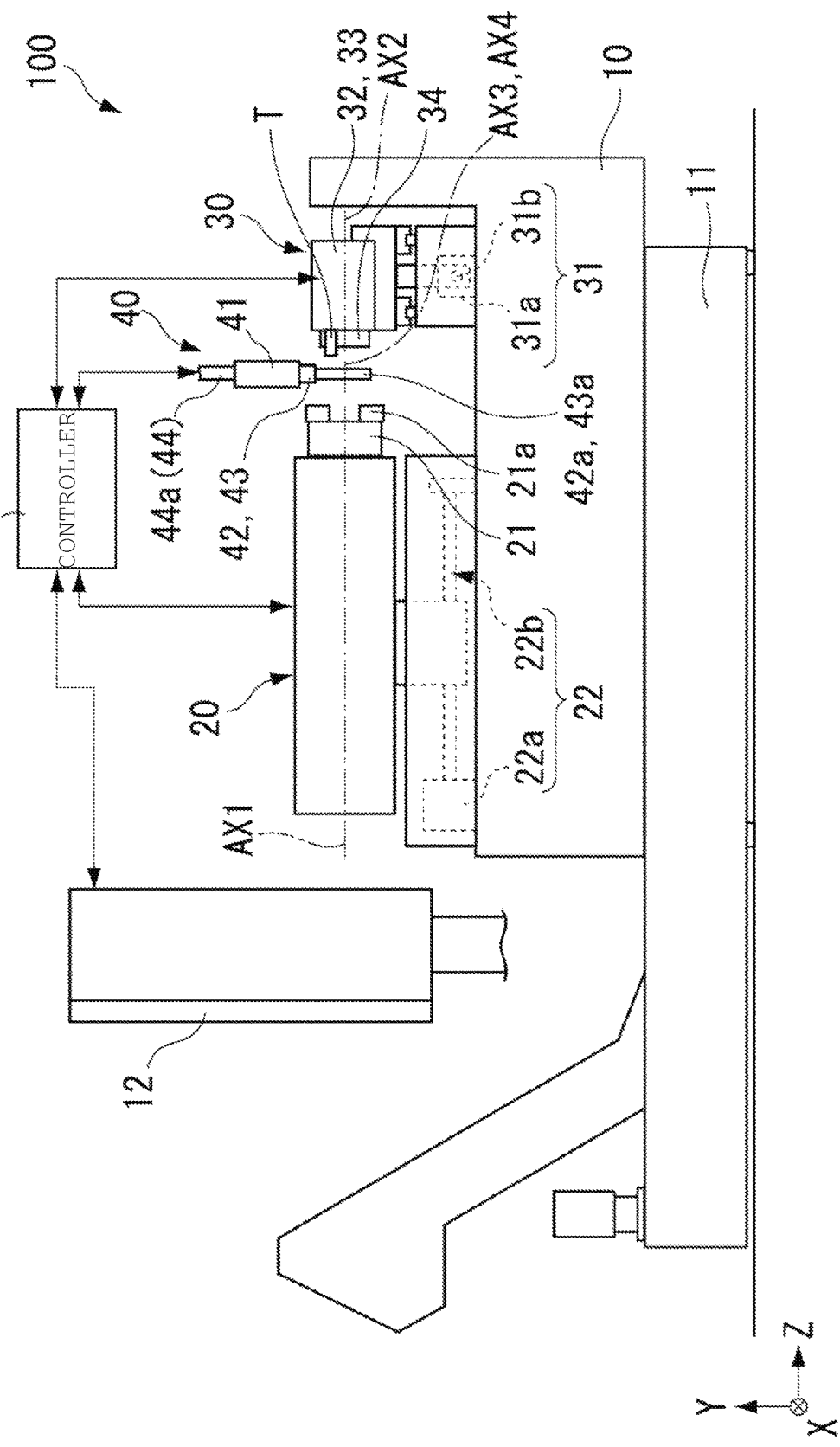
FIG. 1 is a diagram illustrating an example of a machine tool according to a preferred embodiment of the present invention.

Hereinafter, preferred embodiments of the present invention will be described with reference to the drawings. However, the present invention is not limited to the preferred embodiments described herein. In the drawings, scaling is changed appropriately for representation with a portion drawn larger or with emphasis, for example, to describe the various preferred embodiments of the present invention.

FIG. 1 is a diagram illustrating an example of a machine tool 100 according to a preferred embodiment of the present invention. In the description of preferred embodiments of the present invention, directions in the drawings will be described using an XYZ coordinate system. In the XYZ coordinate system, a direction parallel or substantially parallel to a rotation axis AX1 of a spindle 20 is denoted as a Z direction. A direction perpendicular or substantially perpendicular to the Z direction and determining the amount of cutting on a workpiece W is denoted as an X direction. A direction perpendicular or substantially perpendicular to an XZ plane is denoted as a Y direction. Each of the X direction, Y direction, and Z direction will be described as a + direction when it is the direction of an arrow in the drawings, and as a − direction when it is the direction opposite to the direction of the arrow.

The machine tool 100 preferably includes a bed 10, the spindle 20, a tool post 30, a loader 40, and a controller CONT. The machine tool 100 is provided with a workpiece carrying-in section and a workpiece carrying-out section not shown. In the workpiece carrying-in section, a plurality of unworked workpieces W are disposed, for example. In the workpiece carrying-out section, a worked workpiece W is disposed.

The bed 10 supports the spindle 20 and the tool post 30. The bed 10 has legs not shown, and is placed on a floor, for example. A coolant tank 11, for example, is disposed between the bed 10 and the floor. An operating panel 12 or the like operable by an operator is provided on the −Z side of the bed 10.

Figure 3A:
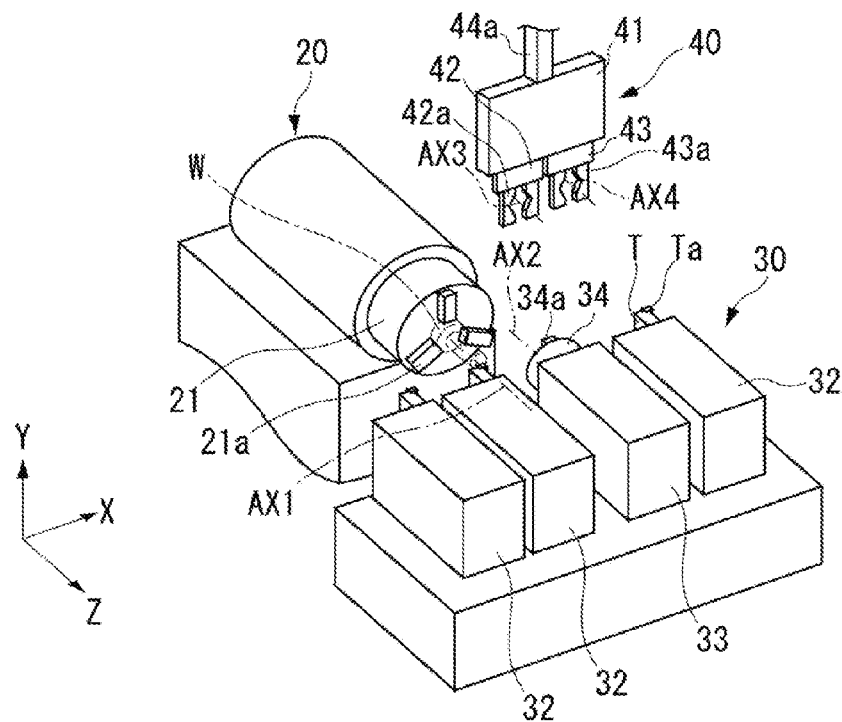
FIGS. 3A and 3B are perspective views showing the example of the spindle, the tool post, and the loader according to a preferred embodiment of the present invention.
Figure 3B:
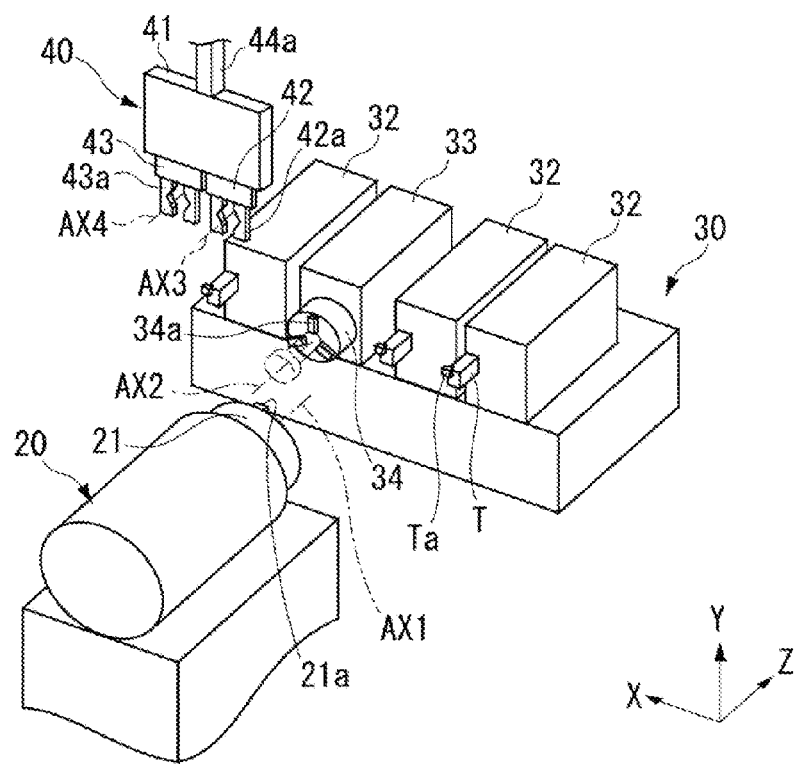

FIGS. 2, 3A, and 3B are diagrams illustrating an example of the spindle 20, the tool post 30, and the loader 40. FIG. 2 is a plan view, and FIGS. 3A and 3B are perspective views. In the FIGS. 3A and 3B, in order to facilitate the understanding of the drawings, a portion of the tool post 30 (a wall on the +Z side) is not shown.

As shown in FIGS. 2, 3A, and 3B, the spindle 20 is supported rotatably about an axis line of the rotation axis AX1 by bearings or the like not shown. The spindle 20 is connected to a drive source not shown to rotate the spindle 20.

A spindle chuck (spindle-side workpiece holder) 21 is provided on the +Z side of the spindle 20. The spindle chuck 21 includes chuck jaws 21a. The plurality of (e.g., three) chuck jaws 21a are disposed at predetermined intervals around the rotation axis AX1 of the spindle 20. The chuck jaws 21a can be moved in a radial direction of the spindle 20 to hold a workpiece W.

The spindle 20 is provided to be able to be moved in the Z direction by a spindle driver 22. The spindle driver 22 includes a drive source 22a and a transmission mechanism 22b. As the drive source 22a, a motor is used, for example. Driving by the drive source 22a is controlled by the controller CONT. As the transmission mechanism 22b, a ball screw mechanism, for example, is used. A guide mechanism (not shown) to guide the spindle 20 in the Z direction may be provided. The spindle 20 is able to be moved by the spindle drive unit 22 between three positions in the Z direction, that is, a workpiece receiving position P1, a working position P2, and a workpiece transferring position P3.

The tool post 30 is disposed on the +Z side of the spindle 20. The tool post 30 is able to be moved by a tool post driver 31 in parallel or substantially in parallel with the X direction. The tool post driver 31 includes a drive source 31a and a transmission mechanism 31b. As the drive source 31a, a motor is used, for example. As the transmission mechanism 31b, a ball screw mechanism is used, for example. A guide mechanism or the like is provided to guide the tool post 30 in the X direction.

As the tool post 30, a comb-shaped tool post is used, for example. On the tool post 30, a plurality of tool holders 32 and a workpiece temporary placement unit 33 are provided in parallel or substantially in parallel in the X direction. The arrangement of the tool holders 32 and the workpiece temporary placement unit 33 in the X direction can be set appropriately. To the tool holders 32, a tool T adapted to work on a workpiece W is attached exchangeably.

The workpiece temporary placement unit 33 is provided with a temporary placement chuck (workpiece holder for temporary placement) 34 to temporarily place a workpiece W. The temporary placement chuck 34 includes chuck jaws 34a. The plurality of (e.g. three) chuck jaws 34a are disposed at predetermined intervals around the Z axis. The chuck jaws 34a are able to be moved in a radial direction of the temporary placement chuck 34 to hold a workpiece W.

The workpiece temporary placement unit 33 includes a central axis AX2 parallel or substantially parallel to the rotation axis AX1 of the spindle 20. In the present preferred embodiment, when a cylindrical workpiece is held by the chuck jaws 34a, an axis coincident with the central axis of the workpiece will be described as the central axis AX2 of the workpiece temporary placement unit 33. The workpiece temporary placement unit 33 is disposed so that the height position of the central axis AX2 (position in the Y direction) is identical to the height position of the rotation axis AX1 of the spindle 20.

By moving the tool post 30 by the tool post drive unit 31 in the X direction, the spindle chuck 21 and the temporary placement chuck 34 are moved relatively in a direction (X direction) intersecting the axis line of the rotation axis AX1 of the spindle 20. In the present preferred embodiment, only the tool post 30 preferably is configured to be moved in the X direction, for example. Alternatively, the spindle 20 may be configured to be moved to an X side.

The temporary placement chuck 34 is movable between a facing position Q1 and a separated position Q2. The facing position Q1 is a position in which a workpiece W is able to be transferred to or received from the spindle chuck 21. The separated position Q2 is a position spaced away from the spindle chuck 21, and a position in which a workpiece W is able to be transferred to or received from each of the spindle chuck 21 and the temporary placement chuck 34 individually by the loader 40 described below. In the present preferred embodiment, the spindle 20 is not configured to be moved in the X direction, but the tool post 30 is configured to be moved in the X direction. Thus, positions in the X direction of the temporary placement chuck 34 are set as the facing position Q1 and the separated position Q2. When the spindle 20 is configured to be moved in the X direction, the facing position Q1 and the separated position Q2 can be explained as the placement of both of the spindle chuck 21 and the temporary placement chuck 34.

Since the rotation axis AX1 and the central axis AX2 are identical in height position (position in the Y direction), when the temporary placement chuck 34 is placed in the separated position Q2, the central axis AX2 of the workpiece temporary placement unit 33 and the rotation axis AX1 of the spindle 20 are side by side at a predetermined distance d from each other in a horizontal direction (x direction).

The loader 40 transports a workpiece W to or from the outside of the machine tool 100. The loader 40 includes a base 41, a spindle-corresponding workpiece holder 42, and a temporary placement-corresponding workpiece holder 43. The base 41 is connected to a loader moving mechanism 44. The loader moving mechanism 44 includes a support 44a that supports the base 41, and a drive source and a transmission mechanism not shown connected to the support 44a. The base 41 is provided movably in the X direction, Y direction, and Z direction by the loader moving mechanism 44. The base 41 holds the spindle-corresponding workpiece holder 42 and the temporary placement-corresponding workpiece holder 43.

The spindle-corresponding workpiece holder 42 and the temporary placement-corresponding workpiece holder 43 include a pair of jaws 42a and 43a to hold a workpiece W, respectively. The jaws 42a and 43a protrude linearly from the base 41 in a −Y direction. The jaws 42a and 43a preferably have an identical or substantially identical shape but are not limited to this, and may have different shapes.

The jaws 42a and 43a are provided openably/closably in X directions about central axes AX3 and AX4, respectively. In the present preferred embodiment, when cylindrical workpieces are held by the jaws 42a and 43a, axes coincident with the central axes of the workpieces will be described as the central axes AX3 and AX4 of the jaws 42a and 43a, respectively.

To the base 41, an opening/closing mechanism not shown to open/close the jaws 42a and 43a is provided. The jaws 42a and 43a are able to hold a workpiece W by closing in the X directions, and are able to release a workpiece W by opening in the X directions. Opening/closing operations of the jaws 42a and 43a are able to be controlled individually by the controller CONT. Therefore, the jaws 42a and 43a are able to perform an opening operation or a closing operation simultaneously with each other, and are also able to perform the opposite operations simultaneously, one performing the opening operation while the other performing the closing operation, for example.

The jaws 42a and 43a are arranged so that the respective central axes AX3 and AX4 are in an identical height position (position in the Y direction) and are at a predetermined distance d from each other in the X direction. Therefore, when the temporary placement chuck 34 is in the separated position Q2, the distance (predetermined distance d) between the rotation axis AX1 of the spindle 20 and the central axis AX2 of the workpiece temporary placement unit 33 is equal to the distance (predetermined distance d) between the central axis AX3 of the jaws 42a and the central axis AX4 of the jaws 43a. With this configuration, when the loader 40 is placed so that the spindle-corresponding workpiece holder 42 faces the spindle chuck 21 and the temporary placement-corresponding workpiece holder 43 faces the temporary placement chuck 34, the spindle-corresponding workpiece holder 42 and the temporary placement-corresponding workpiece holder 43 are able to transfer or receive a workpiece W to or from the spindle chuck 21 and the temporary placement chuck 34, respectively.

The controller CONT performs centralized control of an operation of each part of the spindle 20, the tool post 30, and the loader 40. The controller CONT includes a storage device such as a memory to store various programs and information such as a predetermined machining program and data on tools T. The controller CONT is configured or programmed to control an operation of each portion of the spindle 20, the tool post 30, the loader 40, and others based on the predetermined machining program, details of operation of the operating panel 12, or the like, for example.

Next, an operation of the machine tool 100 will be described. First, the controller CONT makes a workpiece W to be worked on held by the spindle 20, using the loader 40, with the spindle 20 placed in the workpiece receiving position P1. In this operation, the controller CONT moves the loader 40 to the workpiece carrying-in section and causes the loader 40 to hold the workpiece W with the pair of jaws 42a of the spindle-corresponding workpiece holder 42.

Figure 4A:
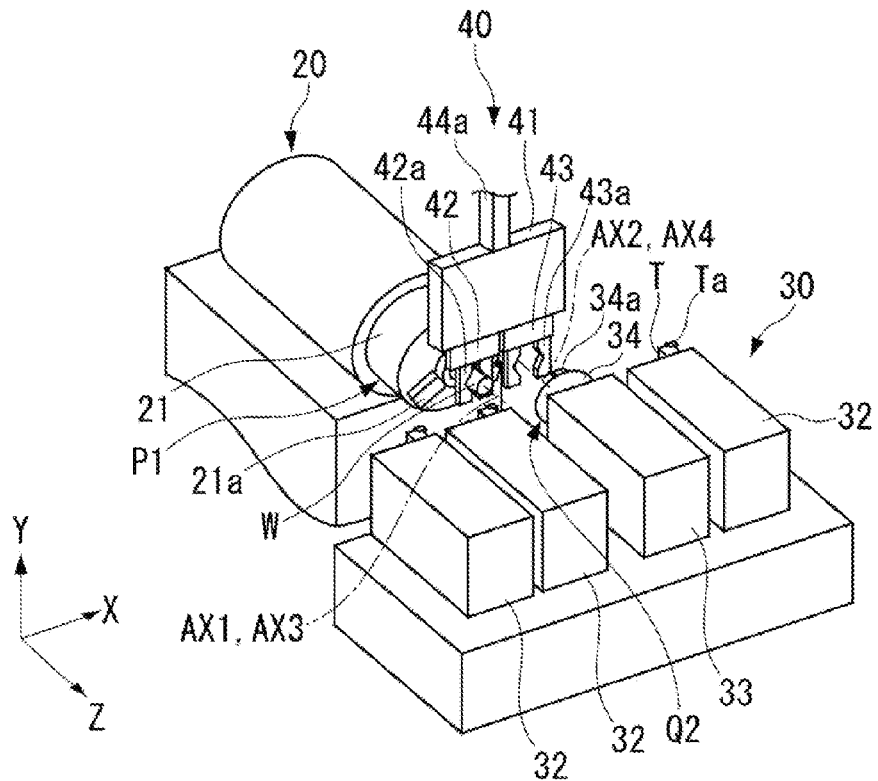
FIGS. 4A and 4B are diagrams illustrating an example of an operation of the machine tool according to a preferred embodiment of the present invention.

Thereafter, the controller CONT moves the loader 40 to the spindle 20 and, as shown in FIG. 4A, causes the spindle-corresponding workpiece holder 42 holding the workpiece W to face the spindle chuck 21. At this time, the controller CONT adjusts the position of the spindle-corresponding workpiece holder 42 so that the central axis AX3 of the jaws 42a coincides with the rotation axis AX1 of the spindle 20. Then, the controller CONT moves the loader 40 to the −Z side to place a −Z side end portion of the workpiece W in a holding position of the spindle chuck 21. In this state, the controller CONT moves the chuck jaws 21a inward in the radial direction of the spindle 20 to cause the chuck jaws 21a to hold the −Z side end portion of the workpiece W. At the same time, the controller CONT opens the jaws 42a of the spindle-corresponding workpiece holder 42 to release the hold of the workpiece W. With this, the workpiece W is transferred from the loader 40 to the spindle 20. In FIG. 4A, the temporary placement chuck 34 is placed in the separated position Q2, and the central axis AX4 of the jaws 43a coincides with the central axis AX2 of the workpiece temporary placement unit 33, as an example. However, when a workpiece W is only transferred from the loader 40 to the spindle 20, this placement is not limiting.

After the workpiece W is transferred to the spindle 20, the controller CONT rotates the spindle 20, thus rotating the workpiece W. The number of rotation of the workpiece W is set appropriately according to working processing. Subsequently, the controller CONT moves the tool post 30 in the X direction to select a tool T. Here, a tool T capable of working on an outer peripheral portion of the workpiece W is selected.

Figure 4B:
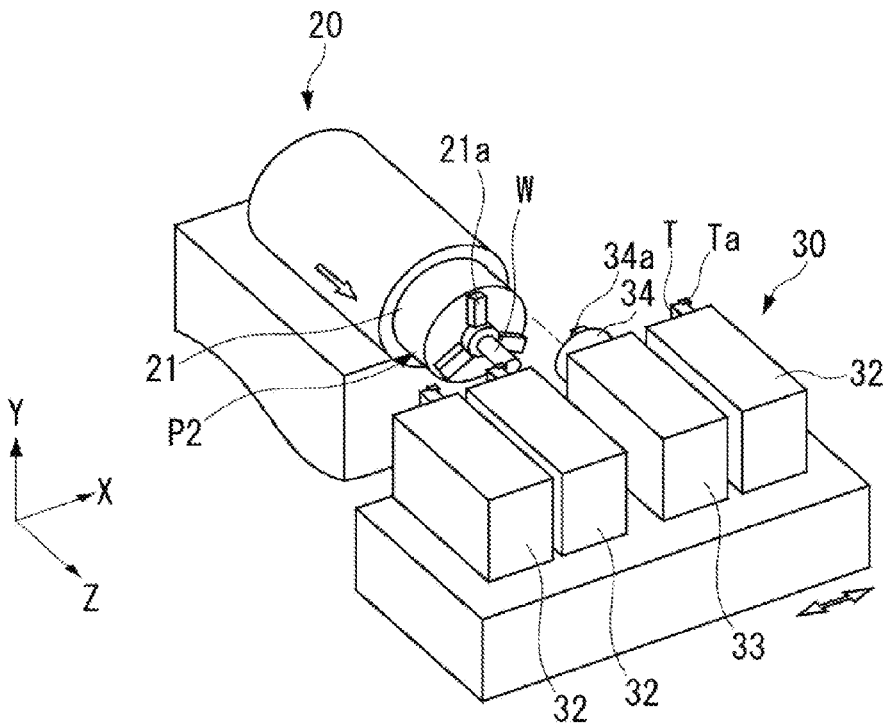

Subsequently, the controller CONT adjusts the position of the tool T in the X direction. In this adjustment, the controller CONT moves the tool post 30 in the X direction so that a tip Ta attached to the distal end of the tool T corresponds to the outer peripheral portion of the workpiece W. The position of the tip Ta in the X direction determines the amount of cutting on the outer peripheral surface of the workpiece W. The amount of cutting may be set to a value predetermined by the controller CONT, or may be set by a manual operation of an operator. Then, in a stage where the rotation of the workpiece W has stabilized, as shown in FIG. 4B, the controller CONT moves the spindle 20 in the +Z direction to place the spindle 20 in the working position P2, and causes the tool T to perform cutting on the outer peripheral portion of the workpiece W.

Figure 5A:
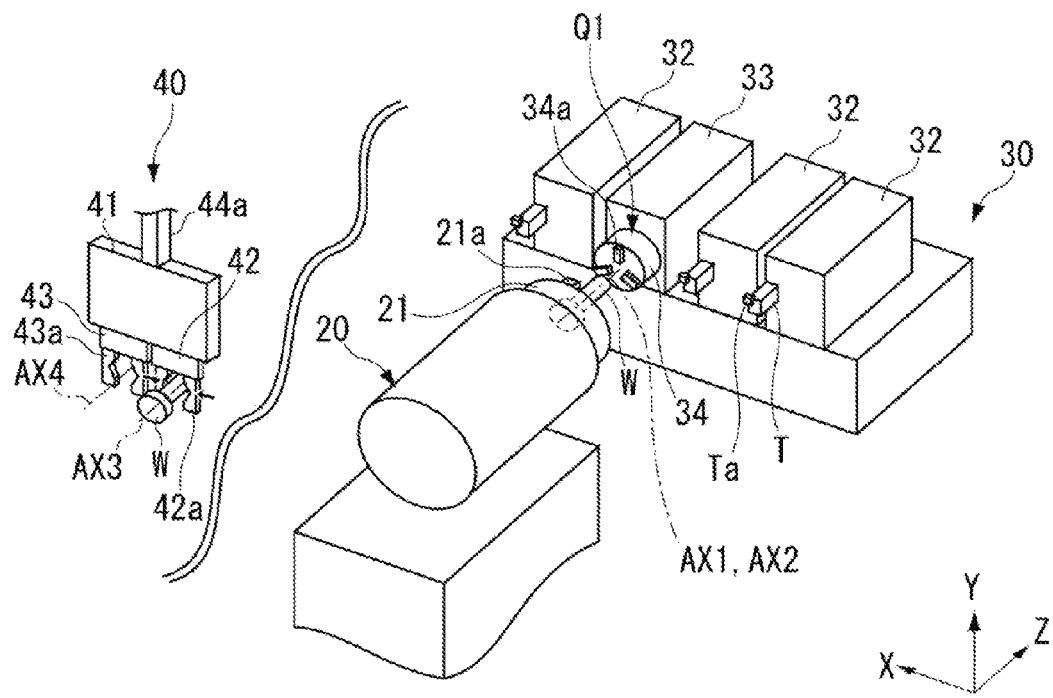
FIGS. 5A and 5B are diagrams illustrating an example of an operation of the machine tool according to a preferred embodiment of the present invention.

After the cutting of the workpiece W is finished, the controller CONT transfers the workpiece W from the spindle 20 to the workpiece temporary placement unit 33. In this operation, as shown in FIG. 5A, the controller CONT first moves the tool post 30 in the X direction so that the temporary placement chuck 34 is placed in the facing position Q1. In this case, the rotation axis AX1 of the spindle 20 coincides with the central axis AX2 of the workpiece temporary placement unit 33.

Figure 5B:
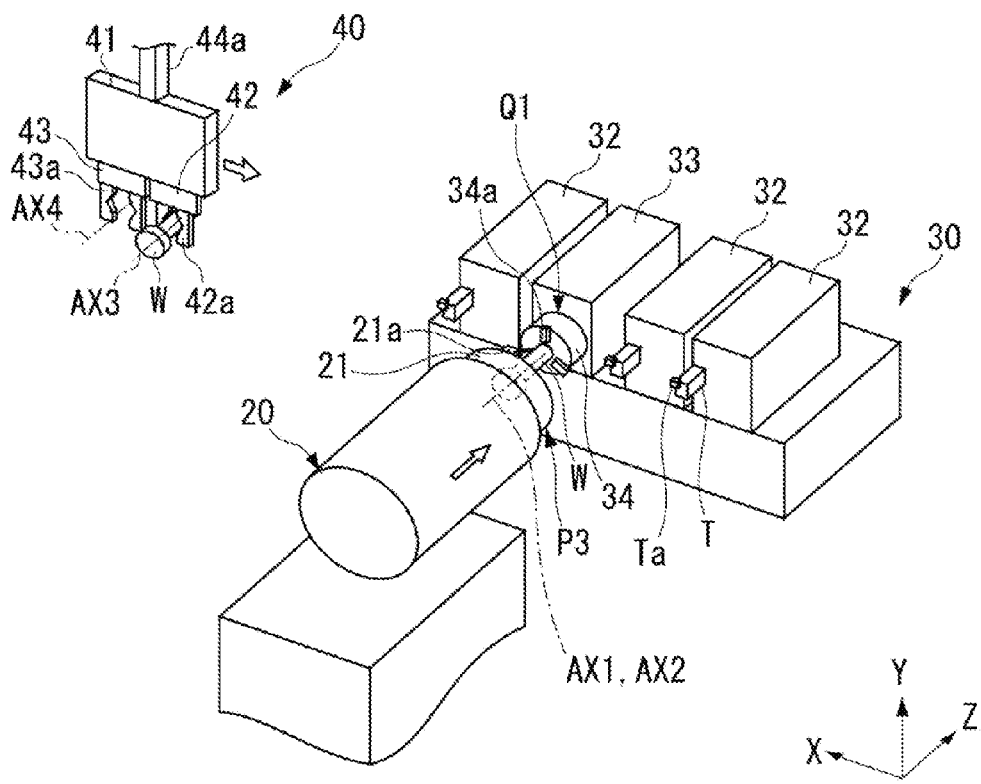

Thereafter, as shown in FIG. 5B, the controller CONT moves the spindle 20 in the +Z direction to the workpiece transferring position P3 to place a +Z side end portion of the workpiece W in a holding position of the temporary placement chuck 34. In this state, the controller CONT moves the chuck jaws 34a inward in the radial direction of the temporary placement chuck 34 to cause the chuck jaws 34a to hold the +Z side end portion of the workpiece W. With this, the workpiece W is transferred from the spindle 20 to the workpiece temporary placement unit 33.

After the workpiece W is transferred to the workpiece temporary placement unit 33, the controller CONT moves the chuck jaws 21a of the spindle chuck 21 outward in a radial direction of the spindle 20 to release the hold of the −Z side end portion of the workpiece W. Then, the controller CONT moves the spindle 20 to the −Z side to place the spindle 20 in the workpiece receiving position P1. At the same time, the controller CONT adjusts the position of the tool post 30 in the X direction to place the temporary placement chuck 34 in the separated position Q2.

Figure 6A:
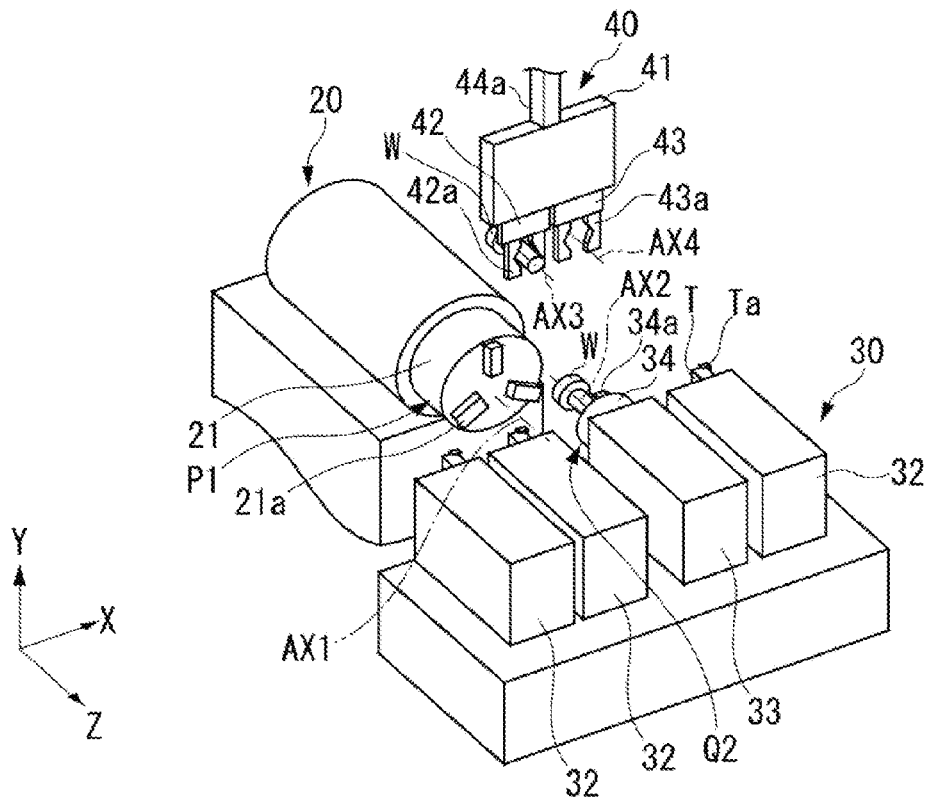
FIGS. 6A and 6B are diagrams illustrating an example of an operation of the machine tool according to a preferred embodiment of the present invention.

On the other hand, while the operation of transferring the workpiece W from the spindle 20 to the workpiece temporary placement unit 33 is performed as described above, the controller CONT causes a workpiece W to be worked on next to be transported. For example, as shown in FIG. 5A, the controller CONT moves the loader 40 to the workpiece carrying-in section to cause the loader 40 to hold a workpiece W to be worked on next by the pair of jaws 42a of the spindle-corresponding workpiece holder 42, for example. Thereafter, as shown in FIG. 5B, the controller CONT moves the loader 40 to the spindle 20 side. Then, as shown in FIG. 6A, the controller CONT adjusts the position of the loader 40 so that the spindle-corresponding workpiece holder 42 and the temporary placement-corresponding workpiece holder 43 are placed above (on the +Y side) the spindle chuck 21 and the temporary placement chuck 34, respectively. At this time, the controller CONT keeps the pair of jaws 43a of the temporary placement-corresponding workpiece holder 43 in an open state.

Figure 6B:
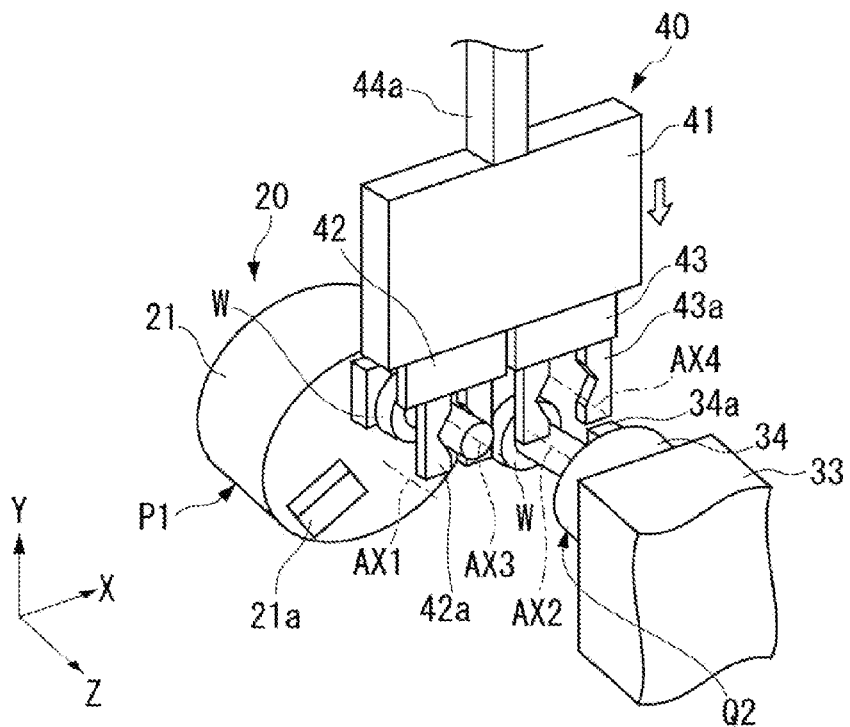
Figure 7A:
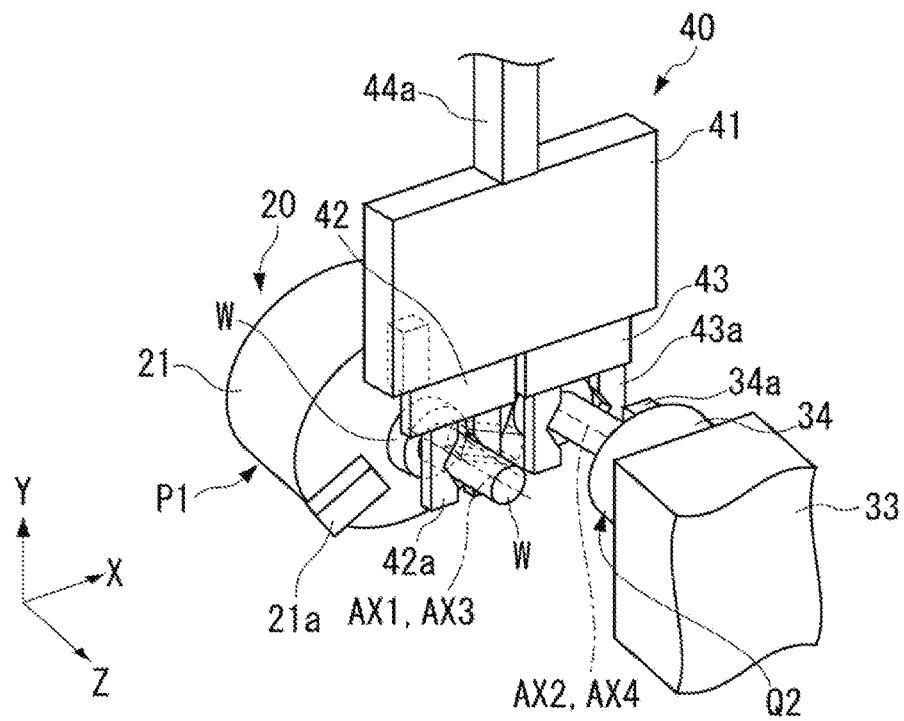
FIGS. 7A and 7B are diagrams illustrating an example of an operation of the machine tool according to a preferred embodiment of the present invention.
Figure 7B:
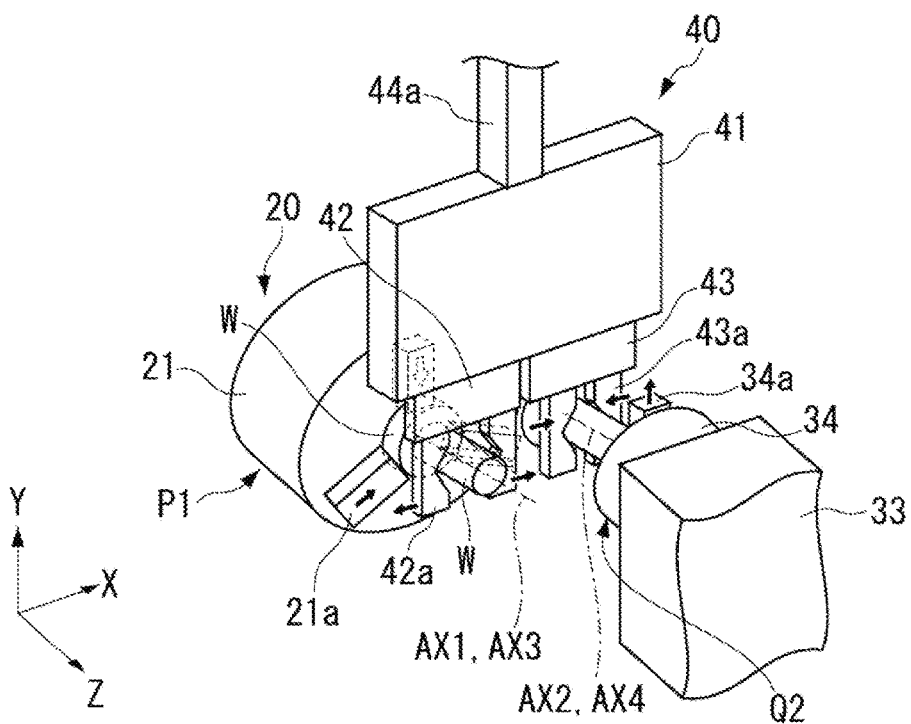

Next, as shown in FIG. 6B, the controller CONT moves the loader 40 in the −Y direction. In FIG. 6B and FIGS. 7A and 7B below, the spindle chuck 21 and the temporary placement chuck 34 and their vicinities are shown enlarged to facilitate the understanding of the drawings. When the loader 40 is moved in the −Y direction, the controller CONT adjusts the position of the loader 40 in the Z direction so that the −Z side end portion of the workpiece W held by the jaws 42a passes through the +Z side of the chuck jaws 21a. This prevents interference between the workpiece W held by the jaws 42a and the chuck jaws 21a of the spindle chuck 21.

By the movement of the loader 40, as shown in FIG. 7A, the spindle-corresponding workpiece holder 42 faces the spindle chuck 21, and the temporary placement-corresponding workpiece holder 43 faces the temporary placement chuck 34. At this time, the rotation axis AX1 of the spindle 20 coincides with the central axis AX3 of the jaws 42a, and the central axis AX2 of the workpiece temporary placement unit 33 coincides with the central axis AX4 of the jaws 43a. Thus, by moving the loader 40 in a vertical direction (Y direction), interference with the spindle chuck 21, the temporary placement chuck 34, or the like are prevented during moving.

From this state, the controller CONT moves the loader 40 to the −Z side to place the −Z side end portion of the workpiece W in the holding position of the spindle chuck 21. Then, as shown in FIG. 7B, the controller CONT simultaneously performs an operation of closing the chuck jaws 21a of the spindle chuck 21, an operation of opening the jaws 42a of the spindle-corresponding workpiece holder 42, an operation of opening the chuck jaws 34a of the temporary placement chuck 34, and an operation of closing the jaws 43a of the temporary placement-corresponding workpiece holder 43, for example.

In this case, on the spindle 20 side, holding of the workpiece W by the spindle chuck 21 and releasing of hold of the workpiece W by the spindle-corresponding workpiece holder 42 are performed simultaneously to transfer the workpiece W from the spindle-corresponding workpiece holder 42 to the spindle chuck 21. At the same time, on the workpiece temporary placement unit 33 side, releasing of hold of the workpiece W by the temporary placement chuck and holding of the workpiece W by the temporary placement-corresponding workpiece holder 43 are performed simultaneously to transfer the workpiece W from the temporary placement chuck 34 to the temporary placement-corresponding workpiece holder 43.

Therefore, an operation of transferring the workpiece W to the spindle chuck 21 by the spindle-corresponding workpiece holder 42 and an operation of receiving the workpiece W from the temporary placement chuck 34 by the temporary placement-corresponding workpiece holder 43 are performed simultaneously. Thus, by using the loader 40, the controller CONT is able to simultaneously perform the operation of transferring the workpiece W to the spindle 20 and the operation of receiving the workpiece W from the workpiece temporary placement unit 33. By performing the opposite operations simultaneously, the time required to transfer and receive the workpieces W is reduced.

The controller CONT does not need to perform all of the above three operations simultaneously, and may perform the hold-releasing operation by the spindle-corresponding workpiece holder 42 and the holding operation by the temporary placement-corresponding workpiece holder 43 simultaneously after performing the operation of holding the workpiece W by the spindle chuck 21, for example. The hold-releasing operation by the spindle-corresponding workpiece holder 42 and the holding operation by the temporary placement-corresponding workpiece holder 43 are not limited to a mode in which all the operations are performed simultaneously, and may be in a mode in which some of the operations are performed simultaneously.

Figure 8:
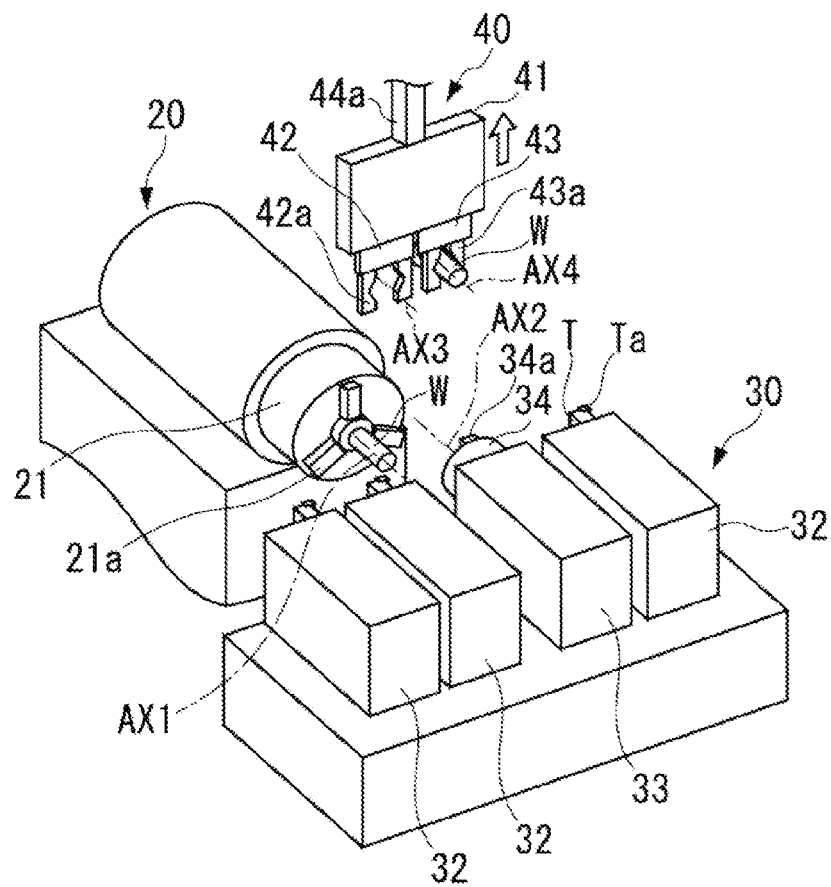
FIG. 8 is a diagram illustrating an example of an operation of the machine tool according to a preferred embodiment of the present invention.

After the operation of transferring the workpieces W is performed, as shown in FIG. 8, the controller CONT moves the loader 40 in the +Y direction to transport the received worked workpiece W to the workpiece carrying-out section. On the other hand, the controller CONT performs working on the unworked workpiece W newly held by the spindle chuck 21. At this time, the controller CONT first rotates the spindle 20, and adjusts the position of the tool post 30 in the X direction. Thereafter, the controller CONT moves the spindle 20 in the +Z direction to place the spindle 20 in the working position P2, and performs cutting on the outer peripheral portion of the workpiece W by the tool T (for example, see FIG. 4B).

After the working, the controller CONT performs the operation of transferring the worked workpiece W from the spindle 20 to the workpiece temporary placement unit 33 again. Then, using the loader 40, the controller CONT performs the operation of transferring a new unworked workpiece W to the spindle 20, and simultaneously performs the operation of receiving the worked workpiece W from the workpiece temporary placement unit 33. By repeating the series of operations, a plurality of unworked workpieces W disposed in the workpiece carrying-in section are sequentially worked on.

As described above, according to the present preferred embodiment, when the temporary placement chuck 34 is in the separated position Q2, the spindle-corresponding workpiece holder 42 and the temporary placement-corresponding workpiece holder 43 is able to simultaneously transfer and receive a workpiece W to and from the spindle chuck 21 and the temporary placement chuck 34, respectively. This reduces the time required to transfer a workpiece W between the spindle 20 and the loader 40, reducing the time required for entire machining, and thus increasing machining efficiency.

Although preferred embodiments of the present invention have been described above, the present invention is not limited to the above description, and various changes may be made without departing from the scope of the present invention.

For example, the above preferred embodiments have been described with a configuration in which two-way jaws are used as the jaws 42*a* of the spindle-corresponding workpiece holder 42 and the jaws 43*a* of the temporary placement-corresponding workpiece holder 43 as an example, which is not limiting. Jaws in another configuration such as three-way jaws may be used.

The above preferred embodiments have been described with a configuration in which the spindle chuck 21 is used as a spindle holder and the temporary placement chuck 34 is provided as a temporary placement holder as an example, which is not limiting. Holders other than chucks may be used as long as they are configured to be able to hold a workpiece W.

The above preferred embodiments have been described with a configuration in which the jaws 42*a* and the jaws 43*a* are disposed to extend in the Y direction as an example, which is not limiting. The jaws 42*a* and the jaws 43*a* may be disposed to extend in another direction such as the Z direction. The above preferred embodiments have been described with a configuration in which the jaws 42*a* and the jaws 43*a* extend in the same direction as an example, which is not limiting. The jaws 42*a* and the jaws 43*a* may be disposed to extend in different directions.

The above preferred embodiments have been described with a configuration in which the single workpiece temporary placement unit 33 is provided as an example, which is not limiting. It may have a configuration in which a plurality of workpiece temporary placement units 33 are provided. In this case, a plurality of temporary placement-corresponding workpiece holders 43 of the loader 40 corresponding to the number of the workpiece temporary placement units 33 may be provided.

The above preferred embodiments have been described with a configuration in which the workpiece temporary placement unit 33 is disposed between the tool holders 32 as an example, which is not limiting. The workpiece temporary placement unit 33 may be disposed at an end in the X direction. With this, chips are less likely to get on the workpiece temporary placement unit 33. The above preferred embodiments have been described with a configuration in which the workpiece temporary placement unit 33 is provided on the tool post 30 as an example, which is not limiting. The workpiece temporary placement unit 33 may be disposed in an area other than the tool post 30.

The above preferred embodiments have been described with a configuration in which the single spindle 20 is provided as an example, which is not limiting. It may have a configuration in which a plurality of (e.g. two) spindles 20 are provided. In this case, a plurality of loaders 40 may be provided, depending on the number of the spindles 20.

The above preferred embodiments have been described with a mode in which the loader 40 transfers an unworked workpiece W to the spindle chuck 21, and receives a worked workpiece W from the temporary placement chuck 34 as an example, which is not limiting. For example, it may use a mode in which the loader 40 transfers an unworked workpiece W to the temporary placement chuck 34 and receives a worked workpiece W from the spindle chuck 21. In this case, the controller CONT may control to transfer an unworked workpiece W from the temporary placement chuck 34 to the spindle chuck 21. While an unworked workpiece W is transferred from the temporary placement chuck 34 to the spindle chuck 21, the controller CONT causes the loader 40 to carry out a worked workpiece W. With this, transfer of an unworked workpiece W and transportation of a worked workpiece W are able to be performed at the same time, resulting in a reduced non-working time of a workpiece W.

The above preferred embodiments have been described with a mode in which by moving at least one of the spindle chuck 21 and the temporary placement chuck 34 in the X direction (a direction intersecting the axial direction of the rotation axis AX1 of the spindle 20), the spindle chuck 21 and the temporary placement chuck 34 are moved relatively to the facing position Q1 and to the separated position Q2 as an example, which is not limiting. For example, by moving at least one of the spindle chuck 21 and the temporary placement chuck 34 in the Z direction (a direction along the axial direction of the rotation axis AX1 of the spindle 20), the spindle chuck 21 and the temporary placement chuck 34 may be moved relatively to a facing position and to a separated position. A loader is configured so that the spindle-corresponding workpiece holder 42 and the temporary placement-corresponding workpiece holder 43 are aligned in the Z direction, for example. The controller CONT places the spindle chuck 21 and the temporary placement chuck 34 far enough apart to allow a worked workpiece W and an unworked workpiece W to be placed in line at a distance from each other in the Z direction. Consequently, when the diameter of a workpiece W is greater than its axial length, for example, a moving distance is able to be reduced compared to that of the relative movement of the spindle chuck 21 and the temporary placement chuck 34 in the X direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A machine tool comprising:
    a spindle-side workpiece holder provided to a spindle that rotates about an axis, the spindle-side workpiece holder being capable of holding a workpiece to be worked on;
    a workpiece holder for temporary placement capable of holding the workpiece;
    a driver that moves the spindle-side workpiece holder and the workpiece holder for temporary placement relatively to a facing position in which the spindle-side workpiece holder and the workpiece holder for temporary placement are able to transfer or receive the workpiece to or from each other, and to a separated position in which the spindle-side workpiece holder and the workpiece holder for temporary placement are able to transfer or receive the workpiece individually; and
    a single loader that includes:
        a spindle-corresponding workpiece holder that includes a surface that faces the spindle-side workpiece holder in the separated position; and
        a temporary placement-corresponding workpiece holder that includes a surface that faces the workpiece holder for temporary placement in the separated position; wherein
    the spindle-side workpiece holder and the workpiece holder for temporary placement are moved relatively in a direction intersecting the axis of the spindle; and
    the spindle-corresponding workpiece holder transfers or receives the workpiece to or from the spindle-side workpiece holder and, simultaneously, the temporary placement-corresponding workpiece holder transfers or receives the workpiece to or from the workpiece holder for temporary placement.

2. The machine tool according to claim 1, wherein
    the spindle-corresponding workpiece holder and the temporary placement-corresponding workpiece holder each include a pair of jaws capable of holding the workpiece; and
    the jaws are disposed side by side in the direction intersecting the axis of the spindle.

3. The machine tool according to claim 1, further comprising:
    a tool post holding a cutting tool to work on the workpiece; and
    a tool post driver moves the tool post with respect to the workpiece; wherein
    the workpiece holder for temporary placement is provided on the tool post, and the tool post driver is used as the driver.

4. The machine tool according to claim 1, further comprising:
    a controller configured or programmed to control the spindle-corresponding workpiece holder and the temporary placement-corresponding workpiece holder, the controller operating one of the spindle-corresponding workpiece holder and the temporary placement-corresponding workpiece holder to receive the workpiece, and simultaneously operating the other of the spindle-corresponding workpiece holder and the temporary placement-corresponding workpiece holder to transfer the workpiece held in advance.

5. The machine tool according to claim 4, wherein the controller transports the workpiece by the loader while the workpiece is transferred between the spindle-side workpiece holder and the workpiece holder for temporary placement.

* * * * *